(No Model.) 2 Sheets—Sheet 1.
S. H. STUPAKOFF.
MANUFACTURE OF JAWS FOR COUPLING RODS.
No. 501,851. Patented July 18, 1893.
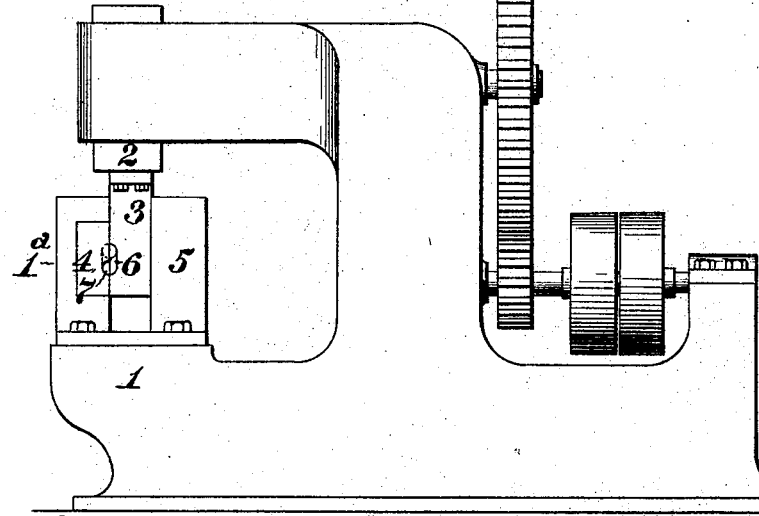
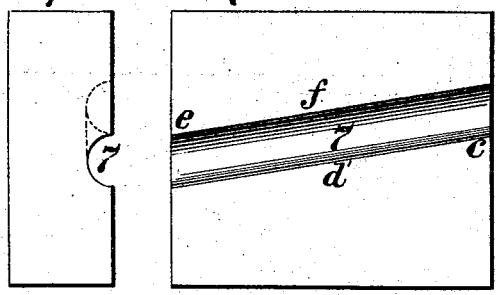
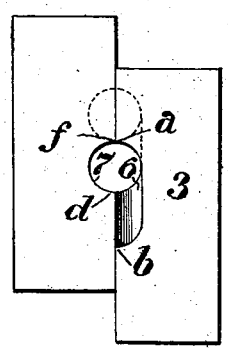
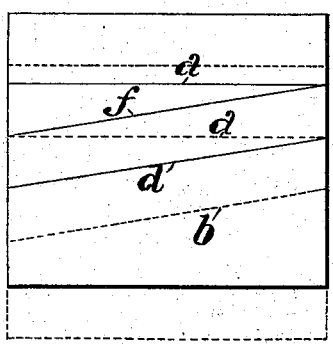
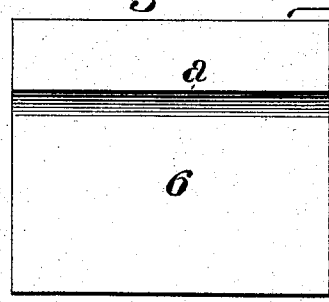
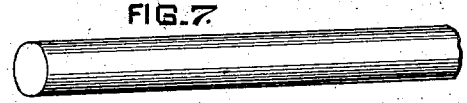
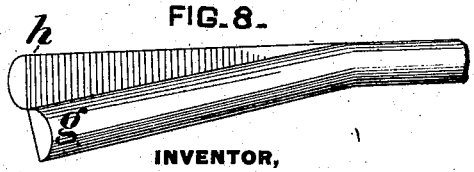
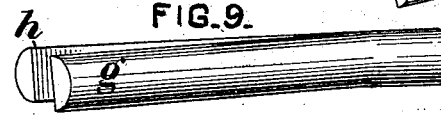
WITNESSES:
Dannie S. Wolcott
F. E. Gaither.
INVENTOR,
Simon H. Stupakoff
by George H. Christy
Att'y.

(No Model.) 2 Sheets—Sheet 2.
S. H. STUPAKOFF.
MANUFACTURE OF JAWS FOR COUPLING RODS.
No. 501,851. Patented July 18, 1893.
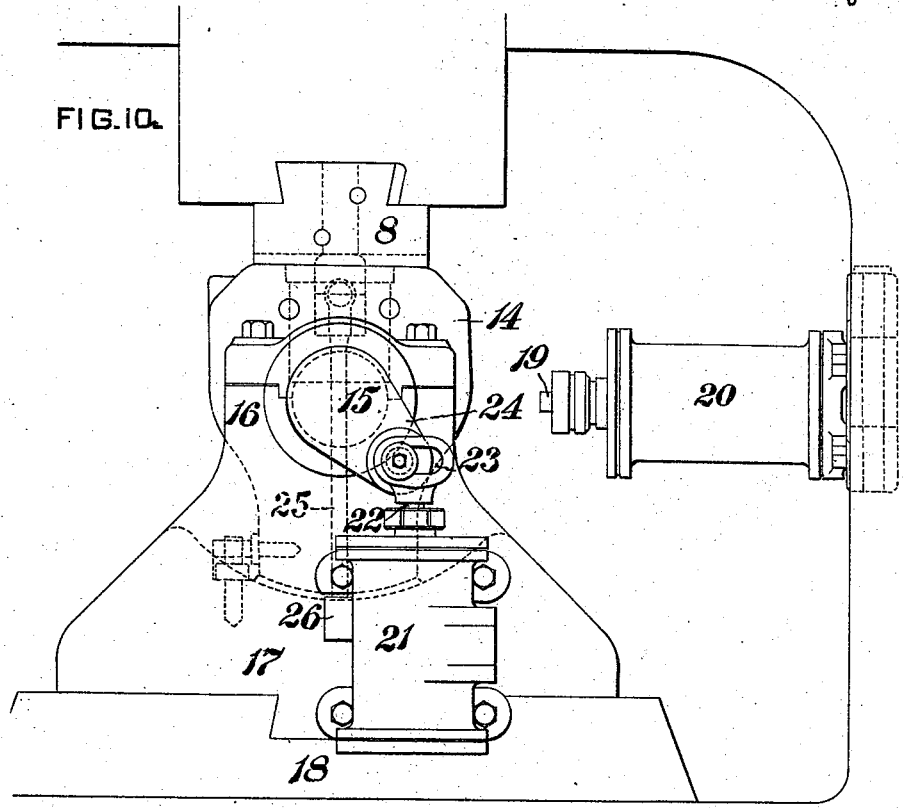
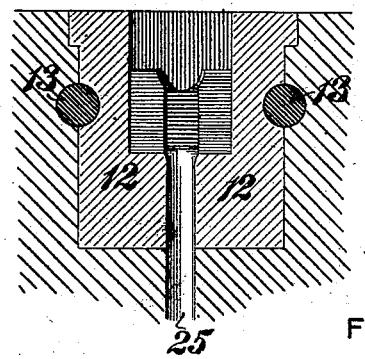
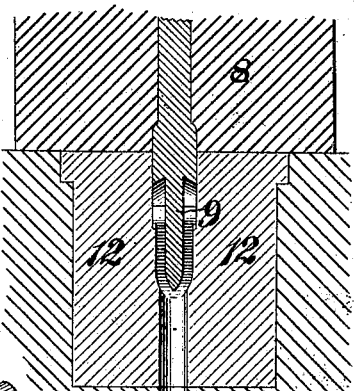
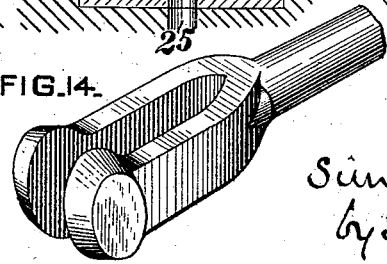
WITNESSES:
Darwin B. Wolcott
F. E. Gaither.
INVENTOR,
Simon H. Stupakoff,
by George H. Christy
Att'y.

UNITED STATES PATENT OFFICE.

SIMON H. STUPAKOFF, OF PITTSBURG, PENNSYLVANIA, ASSIGNOR OF ONE-HALF TO EDWARD H. GOODMAN, OF SAME PLACE.

MANUFACTURE OF JAWS FOR COUPLING-RODS.

SPECIFICATION forming part of Letters Patent No. 501,851, dated July 18, 1893.

Application filed November 29, 1892. Serial No. 453,480. (No model.)

*To all whom it may concern:*

Be it known that I, SIMON H. STUPAKOFF, a citizen of the United States, residing at Pittsburg, in the county of Allegheny and State of Pennsylvania, have invented or discovered certain new and useful Improvements in the Manufacture of Jaws for Coupling-Rods, of which improvement the following is a specification.

The invention described herein relates to certain improvements in the manufacture of jaws for coupling rods and in apparatus employed in such manufacture.

It has been customary in the manufacture of jaws for coupling rods to draw down one end of a bar to the shape and size of one member or jaw and then to weld a correspondingly shaped piece to the bar at the junction of the other jaw therewith. Jaws have also been formed by endwise splitting the end of the rod by one or more blows, and then flattening the divided portions. This method is ineffective except in splitting very small rods for a very short distance as an endwise blow is more effective in upsetting than in dividing the bar. Coupling jaws have also been formed by endwise splitting a heated bar for a short distance and then as a part of the same operation, upsetting the split or divided portions of the bar, again splitting and simultaneously upsetting the bar for a short distance, and continuing this alternate splitting and upsetting until the jaws have been completed.

The object of this invention is to avoid frequent reheatings of the bar as such reheatings are injurious to the metal, and to effect the formation of jaws by a series of successive operations each complete before the others are started in lieu of the frequent alternate repetition of the same operations.

In the accompanying drawings forming a part of this specification, Figure 1 is a side elevation of a press for splitting the ends of a bar. Fig. 2 shows an end and side elevation of one of the shearing blades. Fig. 3 shows similar views of the other blade. Fig. 4 is an end elevation of both blades. Fig. 5 is a side elevation of the shearing blades one of the blades being indicated by dotted lines. Fig. 6 is an elevation of modified forms of one of the shearing blades. Figs. 7, 8 and 9 are views of the bar, before being split, after it is split and after the split ends have been returned to approximate parallelism. Fig. 10 is a side elevation of the forming or upsetting press. Fig. 11 is a sectional elevation, on an enlarged scale, of the upsetting and shaping dies. Fig. 12 is a similar view, the plane of section being at right angles to that of Fig. 11. Fig. 13 is a view similar to Fig. 12, the upper and lower dies being shown down in operative position, and Fig. 14 is a perspective view of the completed jaw.

The first step in the practice of my invention is to split the end of the rod on which the jaws are to be formed a sufficient distance to provide sufficient metal in each tang or part for the formation of the body portion and the enlarged head or boss at the end of the jaw. This splitting operation may be effected by any suitable form or construction of shearing or cutting mechanism, as, for example, such as is illustrated on Sheet 1 of the drawings.

The shearing mechanism shown in Fig. 1 is provided with an anvil block 1, and a movable head 2, reciprocating by any suitable construction or arrangement of driving mechanism. To the head 2 is secured the shearing blade or die 3, and on the shoe 1ª is fixed the blade or die 4, and, if desired, the guide block 5, which serves to hold the blade or die 3 against the die 4. As shown in Figs. 2, 3 and 4, grooves 6 and 7 are formed in the adjacent faces of the blades or dies 3 and 4. The groove 6 in the die 4 is made of a depth equal or approximately so to half the diameter of the bar to be cut. The cutting edge $a$ formed by said groove passes straight across the die, while the opposite edge $b$ is at an angle to the edge $a$ so that said groove has a width at one side of the die equal or approximately so to the diameter of the bar to be split, while its width at the opposite side of the die is equal to or slightly greater than twice the diameter of the bar. The groove 7 is made of a width throughout its entire length equal or approximately so, to the diameter of the bar to be split and of a depth equal, or approximately so, to half the diameter of the bar. This groove passes at such an angle across the die, that when one end of the straight cutting edge $a$ of the die 3 reaches in its movement along the die 4, the point $c$ at the corresponding end of the cutting edge $d$ of the die 4, the opposite end of the cutting edge $a$, will just have reached point $e$ of the edge $f$ of the groove. This construction of dies permits of a shearing cut longitudinally of the bar.

As shown in Fig. 1, the normal or feed position of the dies is with the edges $b$ and $d$ in line one with the other. The bar is then slid into the opening formed by the grooves 6 and 7 and the movable die 3 is moved down, thereby splitting the bar as shown in Fig. 8, by the conjoint action of the edges $a$ and $d$. The relative positions of the dies or blades after the splitting operation, are shown in Fig. 4, and those of the tangs formed by the splitting operation in Fig. 8. As the end of the tang $g$ is carried down in the narrow end of the groove 6 during the shearing or splitting operation, it will be raised to parallelism with the tang $h$ by the return movement of the die 3.

While it is preferred to return the tang $g$ to parallelism with the tang $h$ in the manner described, that operation may be effected if desired during the subsequent shaping or forging operation. Hence the face of the die or blade 3 may be cut away below the cutting edge $a$ to a depth equal or approximately so to half the diameter of the bar operated on, as shown in Fig. 6, the die 4 remaining unchanged. After the bar has been split in the manner described, the divided end is heated, until sufficiently plastic, and then placed in the forging press, and the tangs upset and forced into the desired shape.

The forging or shaping apparatus may be of any suitable construction as regards its operating parts. To the movable head 8 of the forging apparatus is secured the male die consisting of the fuller 9, provided with lateral enlargements 10, having recesses 11 in under faces for shaping the upper ends of the jaws. The female die consists of the blocks 12 having their inner adjacent faces suitably recessed to form matrices for shaping the tangs $g$ $h$. These blocks 12 are held by keys 13 in the upper end of the swinging block 14 provided with trunnions 15 mounted in bearings on the upper ends of the arms 16 of the housing or frame 17, which is secured to the anvil 18, as described and shown in application, Serial No. 441,833, filed by me August 1, 1892. The block 14 is shifted from a vertical position to one where the hole 25 through the swinging block is in line with the piston rod 19 of the fluid pressure cylinder 20, by means of a fluid pressure cylinder 21 secured to the frame or housing. The piston rod 22 of said cylinder is provided with a slot 23 engaging a pin on the crank 24 secured to one of the trunnions of the swinging block. After the bar has been split as described, and the tangs or parts thereof heated, it is placed in position, the split and heated portions being located between the die-blocks 12, and the remaining portion being within the hole 25 in the swinging block. This hole is made of such a diameter relative to the bar operated on as to afford a lateral support therefor and thereby prevent its buckling. The lower end of the bar rests upon a steel block 26, which may be removably secured in the housing or frame. After the bar has been placed in position, the male die is forced down, the fuller passing between the tangs pressing them laterally into the matrices and closing the sides of said matrices as shown in Fig. 12. As the male die continues its movement, the enlargements or recessed blocks 10 strike against the ends of the tangs forcing the portions of the tangs projecting above the matrices of the female dies, into said matrices and causing the metal of the tangs to flow laterally and completely fill not only the matrices of the female die, but also the recesses in the enlargements or blocks 10 of the male die. This shaping operation is effected by one blow of the male die. After the male die is withdrawn, the swinging block is shifted by the cylinder 21 until the hole 25 is in line with the piston rod 19, which is then forced into the hole 25, pushing the bar with its completed jaws out of the swinging block. As soon as the completed article has been removed, another split and heated bar is placed in position, the block 14 turned back to normal position and the male die again forced down.

While it is preferred to heat the bar after it has been split, it may be heated before the splitting operation, and immediately after splitting, transferred to the forging press and there shaped as described, both operations being effected at one heat, or the bar may be sheared or split cold, heated and then shaped as described.

It will be observed that in my improved method the bar is split longitudinally, that is the shear blade moves sidewise of the bar, so that there is no upsetting action of the shear blades on the divided portions of the bar, as inevitably occurs when the splitting is effected by an endwise blow. This is an important feature for the reason that the tangs produced by the splitting operation must be longer than the completed jaws, in order to provide sufficient metal for the formation of the heads or enlargements on the ends of the jaws, and the thickening up of the body portions of the jaws, as it is desirable that said body portions should be thicker than one-half of the bar on which the jaws are formed. As before stated, if the splitting be effected by an endwise blow or series of blows, the tangs thus produced will be upset, and will be of the same length, if not shorter, than the jaws to be produced, so that in the subsequent shaping operations the metal of the tangs, will have to flow toward the ends of the tangs in order to form the heads or enlargements of the jaws. Hence, it will be seen that in the methods heretofore employed the metal for the jaws is first upset, i. e., forced in one direction and then in the shaping operations, is forced to flow in the opposite direction. In my improved method, the bar is split by a sidewise shearing action for a distance greater than the length required in the finished jaws, thus providing the surplus metal for the formation of the heads or enlargements at the place where such heads are to be formed, i.e., at or near the ends of the tangs.

It is characteristic of my improved method that the metal of the tangs is condensed or compacted by the upsetting action, whereas in the methods heretofore in use the metal is first compacted by the splitting operation and then expanded or spread out by the shaping operation.

I claim herein as my invention—

1. As an improvement in the art of manufacturing jaws for coupling rods, the method herein described, which consists in splitting a rod or bar by a sidewise shearing action, for a distance greater than the required length of jaws, and then causing the metal of the tangs to flow laterally and longitudinally into matrices suitably shaped for the formation of the body portions and the heads or end enlargements of the jaws, by endwise pressure applied to the ends of the tangs, substantially as set forth.

2. As an improvement in the art of manufacturing jaws for coupling rods, the method herein described, which consists in splitting a rod or bar by a sidewise shearing action, for a distance greater than the required length of jaws, heating the tangs thus formed and then causing the metal of the tangs to flow laterally and longitudinally into matrices suitably shaped for the formation of the body portions and the heads or end enlargements of the jaws, by endwise pressure applied to the ends of the tangs, substantially as set forth.

3. As a step in the art of manufacturing jaws for coupling rods and other articles, the method herein described of splitting the rod or bar which consists in inclosing the portion to be split between suitably grooved dies and then moving one of said dies so that one of the edges of the moving die shall have an angular movement across the groove in the other die, substantially as set forth.

In testimony whereof I have hereunto set my hand.

SIMON H. STUPAKOFF.

Witnesses:
R. H. WHITTLESEY,
DARWIN S. WOLCOTT.